US008151057B1

(12) United States Patent
Koster et al.

(10) Patent No.: US 8,151,057 B1
(45) Date of Patent: Apr. 3, 2012

(54) SHARED CACHE FOR POINT-TO-POINT CONNECTED PROCESSING NODES

(75) Inventors: Michael J. Koster, Austin, TX (US); Shailendra Deva, Sunnyvale, CA (US); Brian W. O'Krafka, Freemont, CA (US)

(73) Assignee: Oracle America, Inc., Redwood CIty, CA (US)

( * ) Notice: Subject to any disclaimer, the term of this patent is extended or adjusted under 35 U.S.C. 154(b) by 1817 days.

(21) Appl. No.: 10/891,594

(22) Filed: Jul. 15, 2004

(51) Int. Cl.
*G06F 12/00* (2006.01)

(52) U.S. Cl. ........ 711/130; 711/141; 711/146; 711/147; 711/E12.023; 711/E12.026

(58) Field of Classification Search .................. 711/130, 711/146
See application file for complete search history.

(56) References Cited

U.S. PATENT DOCUMENTS

| | | | | |
|---|---|---|---|---|
| 6,065,077 | A * | 5/2000 | Fu | 710/100 |
| 6,253,289 | B1 * | 6/2001 | Bates et al. | 711/118 |
| 6,321,296 | B1 * | 11/2001 | Pescatore | 711/118 |
| 6,434,672 | B1 * | 8/2002 | Gaither | 711/130 |
| 6,918,015 | B2 * | 7/2005 | Kessler et al. | 711/148 |
| 2002/0126704 | A1 * | 9/2002 | Cam et al. | 370/503 |
| 2003/0009538 | A1 * | 1/2003 | Shah et al. | 709/219 |
| 2004/0230726 | A1 * | 11/2004 | Blake et al. | 710/100 |
| 2005/0044195 | A1 * | 2/2005 | Westfall | 709/223 |
| 2005/0138299 | A1 * | 6/2005 | Downer et al. | 711/148 |
| 2005/0240735 | A1 * | 10/2005 | Shen et al. | 711/144 |

* cited by examiner

*Primary Examiner* — Reginald Bragdon
*Assistant Examiner* — Aracelis Ruiz
(74) *Attorney, Agent, or Firm* — Osha•Liang LLP

(57) ABSTRACT

A shared cache is point-to-point connected to a plurality of point-to-point connected processing nodes, wherein the processing nodes may be integrated circuits or multiprocessing systems. In response to a local cache miss, a requesting processing node issues a broadcast for requested data which is observed by the shared cache. If the shared cache has a copy of the requested data, the shared cache forwards the copy of the requested data to the requesting processing node.

18 Claims, 10 Drawing Sheets

170
171
172
174
176
173
178
180
182
184
186
188
190
192
194
196
198
200
202
204
Shared Cache
Multiprocessing Node

SHARED CACHE FOR POINT-TO-POINT CONNECTED PROCESSING NODES

BACKGROUND OF INVENTION

As shown in FIG. 1, a typical computer system 10 includes at least a microprocessor 12 and a main memory 14. The main memory 14 contains data for use by the microprocessor 12 to perform the operations of the computer system 10. However, because the speed of the microprocessor 12 is typically significantly faster than that of the main memory 14, memory of smaller size and faster speed (referred to and known as "cache" memory) is often implemented to allow the microprocessor 12 to access frequently and/or recently requested data faster than it would otherwise take to obtain such data from the main memory 14.

Still referring to FIG. 1, the microprocessor 12 has an "on-chip" (i.e., on the same semiconductor die as the microprocessor 12), or "L1," cache memory 16 and an "off-chip," or "L2," cache memory 18. When the microprocessor 12 requests data, a cache controller 20 causes the L1 cache memory 16 to be searched for the requested data, and if that search does not "hit" (i.e., a cache "miss" occurs), the L2 cache memory 18 is searched for the requested data. If the requested data is not found in the cache memories 16, 18, the requested data is retrieved from the relatively slow main memory 14.

Those skilled in the art will recognize that a microprocessor may have any number of cache memory levels, which are typically referred to by number in order of decreasing proximity to the microprocessor. Further, those skilled in the art will recognize that any number of cache memories may be on-chip and any number of cache memories may be off-chip.

A computer system, like the one shown in FIG. 1, may be used as a system that services requests from and provides data to other computers connected over a network. Such a client-server network model 30 is shown in FIG. 2. In FIG. 2, a stand-alone server 32 is connected over a network 34 to several client computers 36, 38, 40, 42. The server 32 may be used to store data, programs, etc. for use by the client computers 36, 38, 40, 42. Those skilled in the art will recognize that the server 32 may also be used to manage and control the client computers 36, 38, 40, 42.

Although some computer systems, like the one shown in FIG. 1, have a single microprocessor 12 (such a computer system referred to and known as a "uniprocessor" computer system), other computer systems, like the server 32 shown in FIG. 2, may be formed of multiple microprocessors. FIG. 3 shows such a multiprocessing computer system 50.

The computer system 50 of FIG. 3 is shown as having multiple microprocessors 52, 54, 56, 58. The microprocessors 52, 54, 56, 58 communicate with one another and with a main memory 60 over a network (e.g., a bus) 62. The network 62 is implemented as a set of bits that propagate data in parallel from one location to another. The "bandwidth" of the network 62 (i.e., the number of bits propagated in parallel by the network 62) is an important factor in the overall performance of the computer system 50. FIG. 3 also shows an input/output interface 64 that is connected to the network 62 and serves to input and output data to other portions of the computer system 50 and/or components external to the computer system 50.

Those skilled in the art will recognize that the multiprocessing computer system 50 of FIG. 3 may represent a particular type of multiprocessing computer system used in networking and known and referred to as a symmetric multiprocessing (SMP) computer system. A SMP computer system is one in which multiple microprocessors share, for example, the same memory and input/output interface. Those skilled in the art will also recognize that a SMP computer system may share the same operating system. Although the multiple microprocessors in a SMP computer system share the same resources, each microprocessor may act independently. For example, while one microprocessor searches for data in memory, other microprocessors may update the memory and perform other tasks, thereby increasing the ability of the SMP computer system to handle intensive networking demands.

Those skilled in the art will recognize that SMP computer systems provide good scalability in that additional microprocessors may be added or removed with minimal changes to the system. Despite the benefits of SMP computer systems, bottlenecks may occur when several microprocessors on a board share a single memory bus. Rather than put too many microprocessors on the same SMP board, designers of network elements often distribute applications across a networked cluster of SMP boards, where each board has its own memory, I/O interface, and operating system.

SUMMARY OF INVENTION

According to one aspect of one or more embodiments of the present invention, a computer system comprises: a plurality of point-to-point connected processing nodes; and a shared cache point-to-point connected to the plurality of processing nodes, where, in response to a broadcast for requested data by at least one of the plurality of processing nodes, the shared cache is configured to forward a copy of the requested data to the at least one of the plurality of processing nodes if the shared cache has a copy of the requested data.

According to one aspect of one or more embodiments of the present invention, a method of performing computer system operations comprises: requesting data from a local cache memory of a processing node; if the requested data is not found in the local cache memory, issuing a broadcast for the requested data to a shared cache point-to-point connected to the processing node; and if the shared cache has a copy of the requested data, forwarding the copy of the requested data to the processing node.

According to one aspect of one or more embodiments of the present invention, a computer network comprises a cluster of individual SMP computer systems that are connectable using point-to-point interconnect, at least one of the individual SMP computer systems having a cache memory point-to-point connected to a plurality of integrated circuits in the at least one of the individual SMP computer systems, where, in response to a broadcast for requested data by at least one of the plurality of integrated circuits, the cache memory is configured to forward a copy of the requested data to the at least one of the plurality of integrated circuits if the cache memory has a copy of the requested data.

According to one aspect of one or more embodiments of the present invention, a computer system comprises a plurality of point-to-point connected integrated circuits, a cache memory point-to-point connected to the plurality of integrated circuits, and memory comprising instructions to: request data from a local cache memory of a processing node; if the requested data is not found, issue a broadcast for the requested data to a cache memory point-to-point connected to the processing node; and if the cache memory has a copy of the requested data, forward the copy of the requesting data to the processing node.

Other aspects and advantages of the invention will be apparent from the following description and the appended claims.

DETAILED DESCRIPTION

Figure 1:
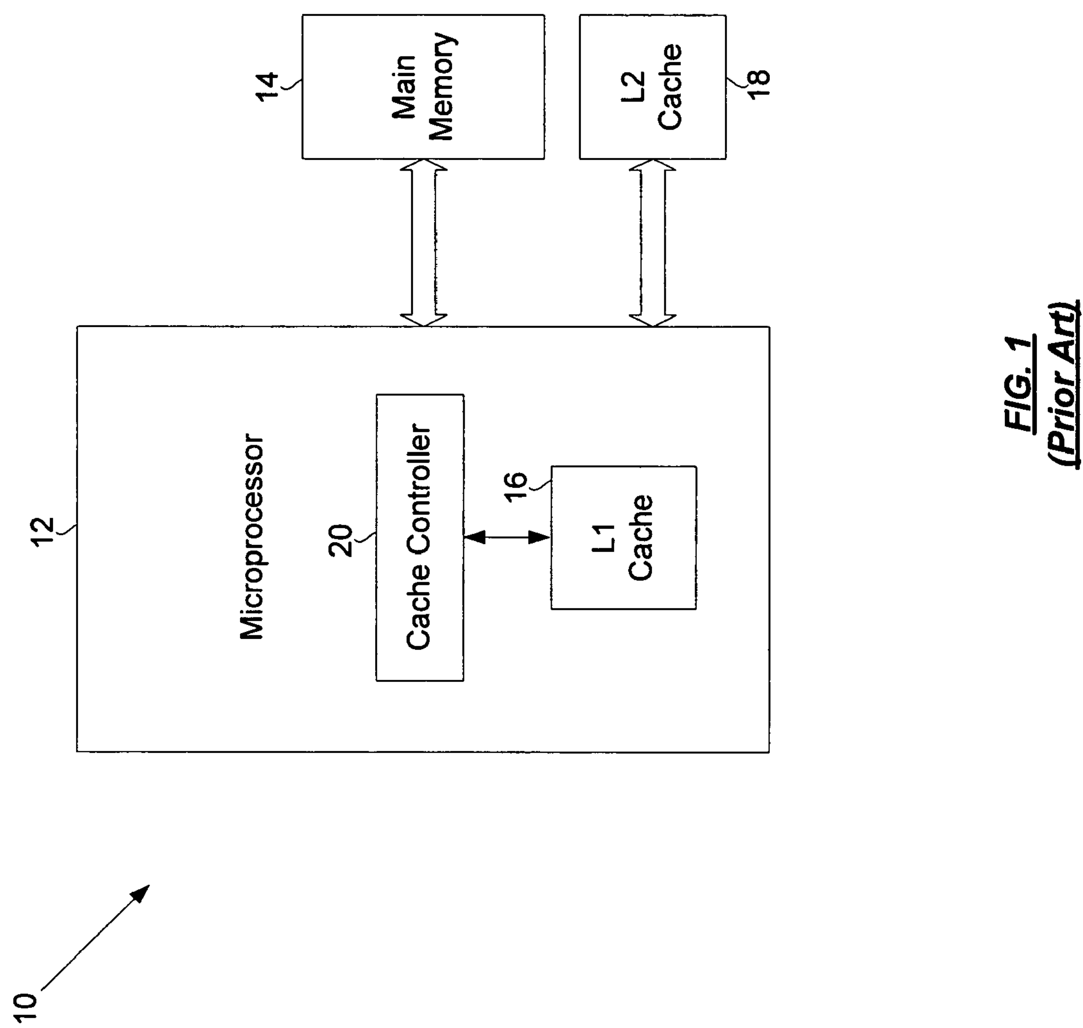
FIG. 1 shows a typical computer system.
Figure 2:
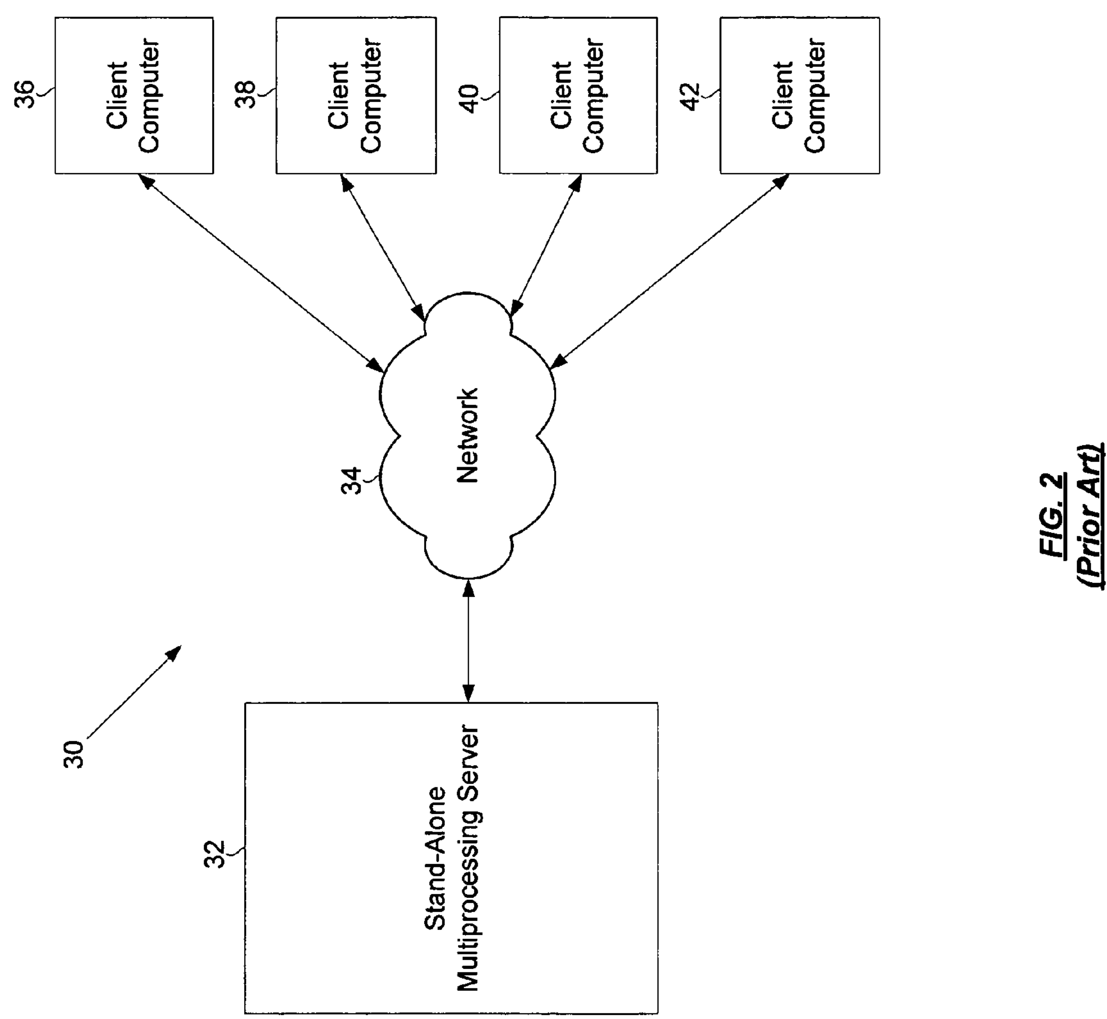
FIG. 2 shows a typical computer network.
Figure 3:
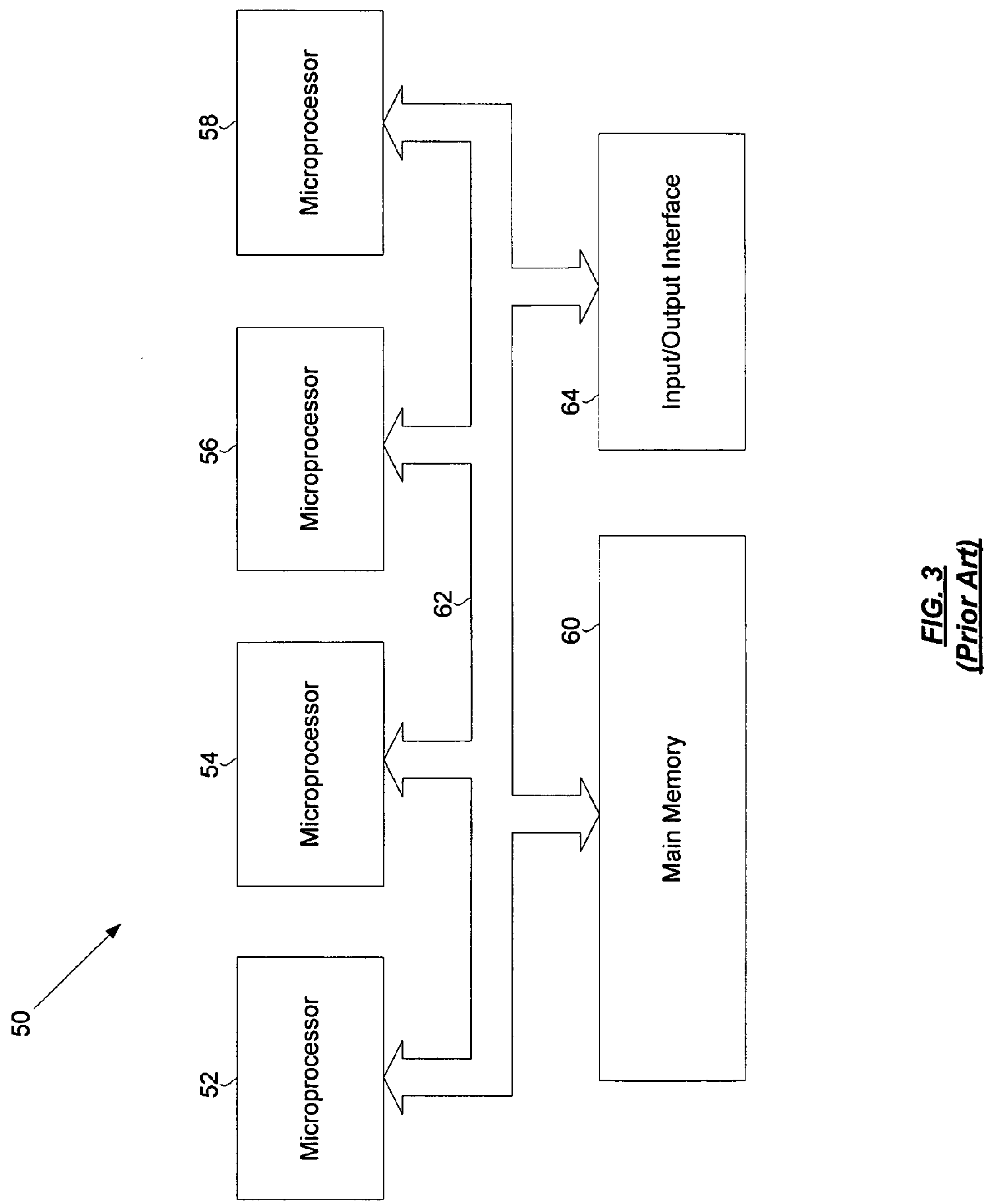
FIG. 3 shows a typical multiprocessor computer system.

In a SMP computer system, such as that shown in FIG. 3, each microprocessor has its own cache memory (see discussion of cache memories above with reference to FIG. 1). Thus, because a particular cache memory data item acted upon by one microprocessor may cause the copy of that data item to differ from other copies of that data item stored in the cache memories of the various microprocessors in a SMP computer system, "cache-coherency" techniques are implemented to ensure that the local cache memory of each microprocessor is consistent with respect to values that are stored in the cache memories of other microprocessors in the SMP computer system.

Cache-coherence problems arise in SMP computer systems when more than one microprocessor cache memory holds a copy of a data item. One type of cache-coherency technique known and referred to as a "snooping" relies on all cache memories to monitor a common network (e.g., a bus) that connects microprocessors to memory. In other words, a snooping-based cache-coherency technique depends on the ability of cache memories to observe every transaction on a network (e.g., a bus) common to the cache memories.

Figure 4:
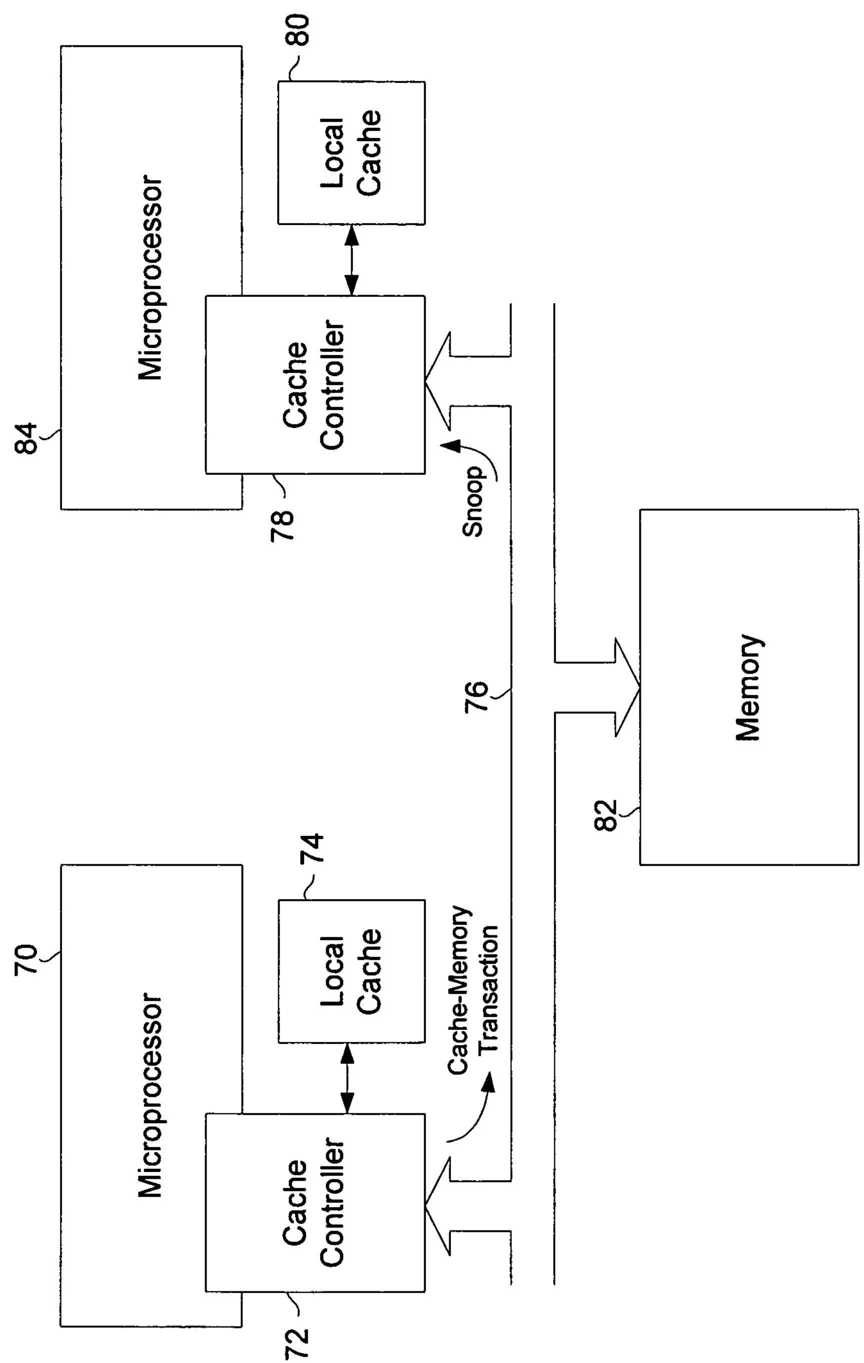
FIG. 4 shows a snooping cache-coherent multiprocessor computer system.

Now referring to FIG. 4, when microprocessor 70 requests data, a cache controller 72 local to microprocessor 70 searches for the requested data in a cache memory 74 local to microprocessor 70. If the requested data is not found in the local cache memory 74, the cache controller 72 broadcasts a data request on a network (e.g., a bus) 76 connected to other cache controllers (e.g., cache controller 78) (others not shown). The cache controllers (e.g., cache controller 78) "snoop" on the network 76 to monitor all transactions on the network 76. If a particular cache memory (e.g., cache memory 80 associated with microprocessor 84) has the data requested by the requesting cache controller 72, the cache controller (e.g., cache controller 78) associated with the cache memory (e.g., cache memory 80) having the requested data forwards (i.e., returns) the requested data to the requesting cache controller 72, which, in turn, updates its associated cache memory 74 with the returned requested data and provides the returned requested data to requesting microprocessor 70. Alternatively, if the requested data is not held in any of the cache memories 74, 80, a copy of the requested data in the main memory 82 is returned to and used by the requesting microprocessor 70.

Further, a cache controller, connected to the network 76 that observes data being written from one cache memory to another may invalidate or update its own copy of that data. The next time the cache controller's microprocessor requests that data, the most recent value of the data is provided to the microprocessor, either because its local cache memory has the most recent value of the data or through obtaining that data by generating a data request on the network 76.

Those skilled in the art will recognize that although a snooping-based cache-coherency technique obtains data relatively quickly (i.e., has relatively low latency), such a technique consumes relatively high bandwidth due to the parallel broadcast nature of its requests. As a result, snooping-based cache-coherency techniques are typically limited to small-scale systems.

Figure 5:
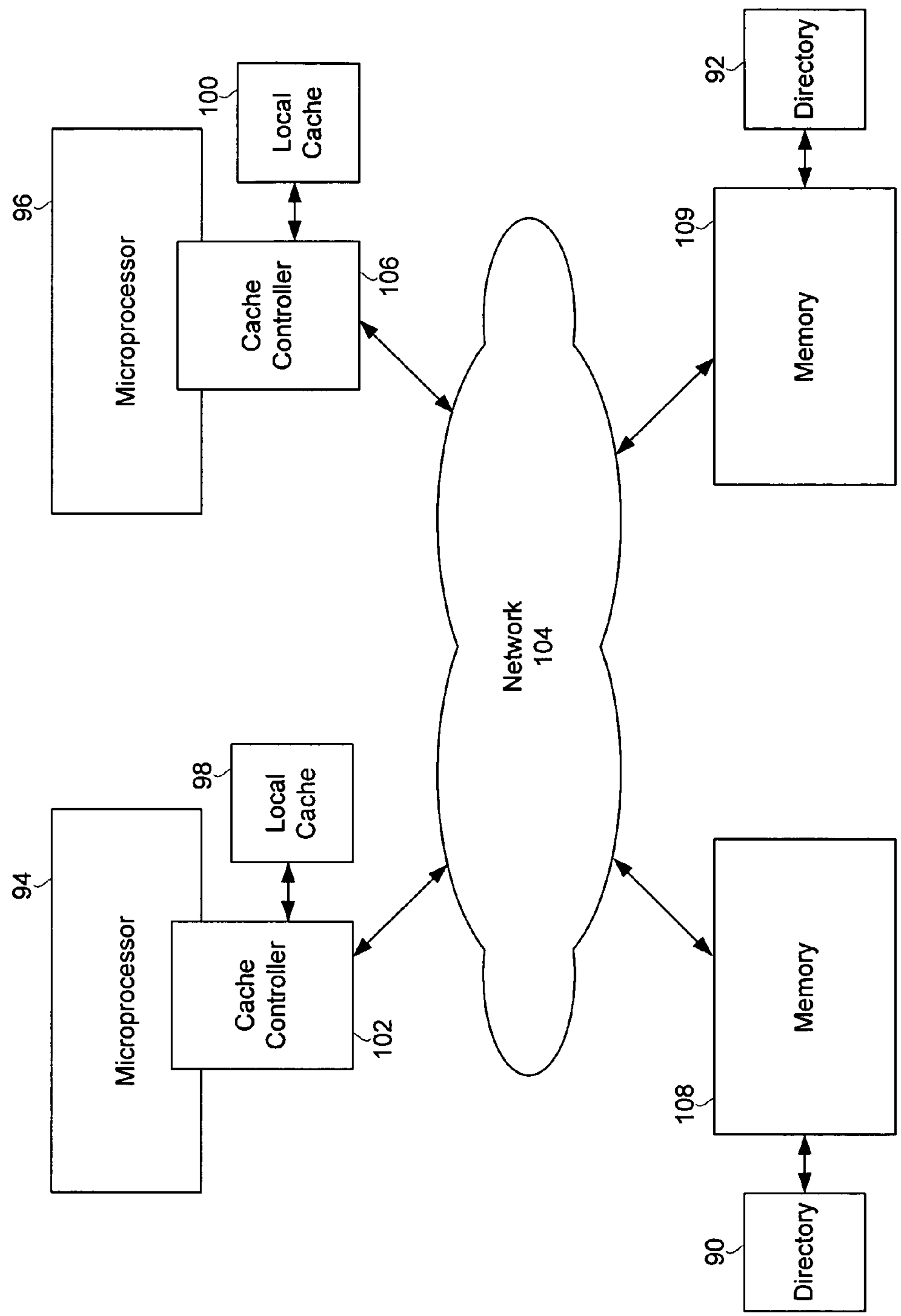
FIG. 5 shows a directory-based cache-coherent multiprocessor computer system.

Now referring to FIG. 5, in another type of cache-coherency technique known and referred to as "directory-based cache-coherence," when a cache miss occurs in a local cache memory (e.g., local cache memory 98 or 100) of a microprocessor (e.g., microprocessor 94 or 96), a cache controller (e.g., cache controller 102 or 106) issues a data request over a network 104 to a "home" directory (e.g., directory 90 or 92) of the requested data, the "home" directory typically being associated with the "home" memory (e.g., memory 108 or 109) of the requested data. The "home" directory may indicate to the cache controller a location of the requested data. Alternatively, if the "home" directory indicates that no other cache memories connected to the network 104 have the requested data, the requested data may be returned by the "home" memory of the requested data.

One advantage of directory-based cache-coherency techniques with respect to snooping-based cache-coherency techniques is that they keep track of which microprocessor nodes have copies of particular data, thereby eliminating the need for a high-bandwidth data request broadcast. This is valuable on read misses because a data request is subsequently satisfied either by the directory indicating the location of a copy of the requested data or by accessing the main memory.

Further, because directory-based cache-coherent techniques may rely on low-bandwidth interconnect rather than on high-bandwidth networks (e.g., buses) that are necessary for broadcasting in snooping-based cache-coherency techniques, directory-based cache-coherent SMP computer systems may be scalable to a large number of microprocessors. However, the indirection overheads associated with directory queries make directory-based cache-coherency techniques slower (i.e., have higher latency) than snooping-based cache-coherency techniques (e.g., a directory-based cache-coherence technique may often require three times the number of "hops" otherwise taken in a snooping-based cache-coherence technique).

For example, in a snooping-based cache-coherency technique, upon a cache miss, one set of parallel messages is broadcast over a bus and one response message with the requested data is sent back to the requesting processing node. On the other hand, in a directory-based cache-coherent technique, upon a cache miss, a data request message is sent to the home processing node, the home processing node forwards the data request message to the owning cache memory, and the owning cache memory returns the requested data to the requesting processing node. Thus, generally, in snooping-based cache-coherency techniques, there are more messages in parallel (relatively low average latency), while in directory-based cache-coherency techniques, there are more messages in series (relatively high average latency).

Often, several small SMP servers (e.g., a near-commodity modular shelf server) are connected together to provide increased processing capabilities. Due to the limited bandwidth of the cables connecting the servers, directory-based cache-coherency techniques are required to ensure cache-coherence among the servers. However, as discussed above, directory-based cache-coherency techniques have relatively high average latency compared to snooping-based cache-coherency techniques.

Figure 6:
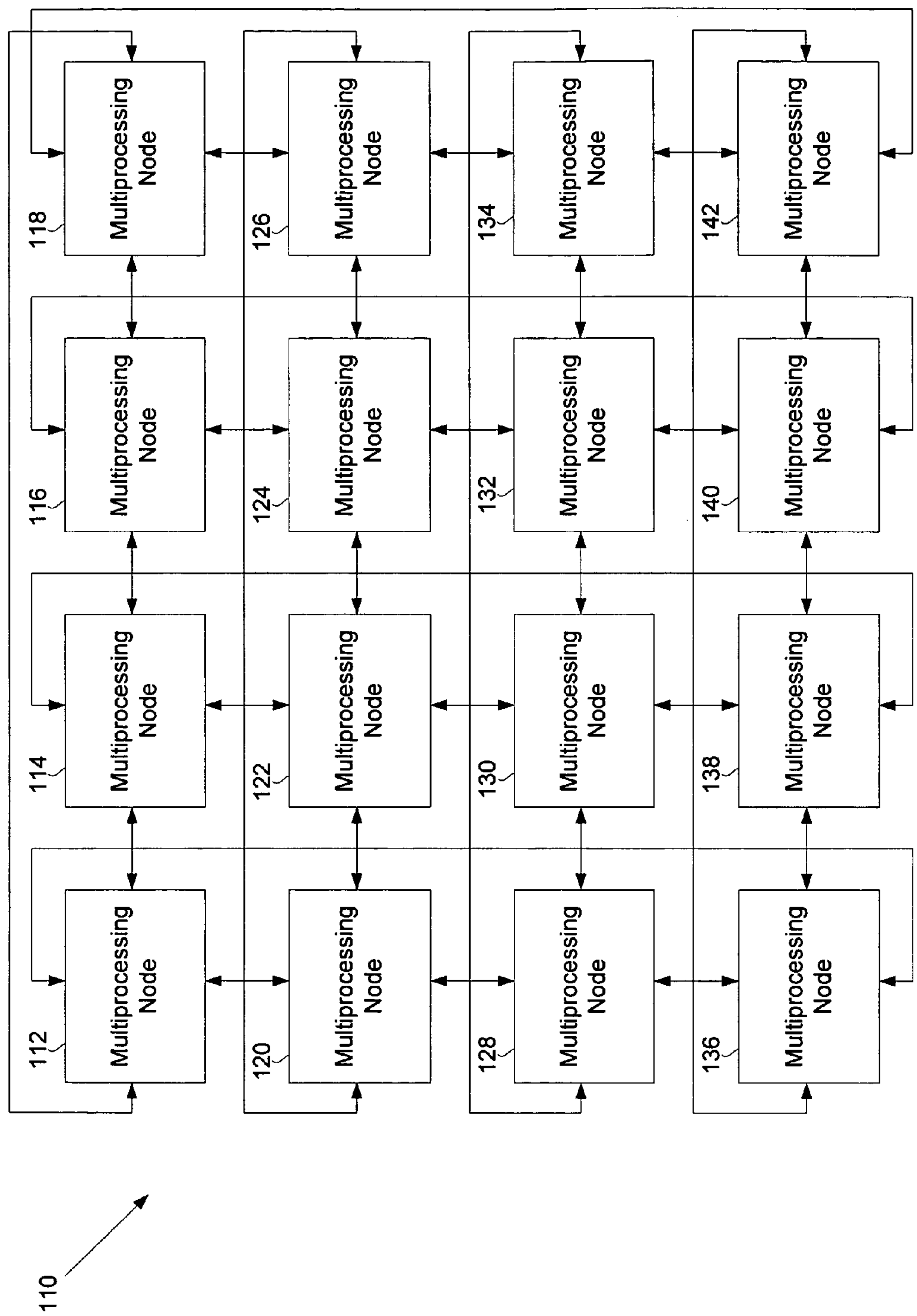
FIG. 6 shows a computer system in accordance with an embodiment of the present invention.

Embodiments of the present invention relate to a technique for implementing snooping-based cache-coherency in a point-to-point connected multiprocessing node. FIG. 6 shows an exemplary computer system 110 in accordance with an embodiment of the present invention. In FIG. 6, a plurality of multiprocessing nodes 112, 114, 116, 118, 120, 122, 124, 126, 128, 130, 132, 134, 136, 138, 140, 142 are point-to-point connected using high-bandwidth interconnect (shown but not labeled). Particularly, each multiprocessing node 112, 114, 116, 118, 120, 122, 124, 126, 128, 130, 132, 134, 136, 138, 140, 142 is connected to an adjacent multiprocessing node (in FIG. 6, each peripheral multiprocessing node is shown as being connected to the opposite peripheral multiprocessing node, e.g., multiprocessing node 112 is connected to multiprocessing node 118). In one or more other embodiments of the present invention, a multiprocessing node may be connected to a non-adjacent multiprocessing node. Further, a multiprocessing node is not limited to a server and may be any type of computer system.

In one or more embodiments of the present invention, high-bandwidth interconnect for point-to-point connected multiprocessing nodes may be implemented using interconnect technologies such as, for example, Infiniband or PCI Express. In one or more other embodiments of the present invention, high-bandwidth interconnect used to point-to-point connect multiprocessing nodes may have a bandwidth greater than that of 16-bit 1 GHz interconnect.

Further, in one or more embodiments of the present invention, point-to-point interconnect may be used in cabling a plurality of multiprocessing nodes (e.g., near-commodity shelf servers) together. Moreover, in one or more embodiments of the present invention, point-to-point interconnect may be used to connect a plurality of multiprocessing nodes to a passive backplane.

Figure 7:
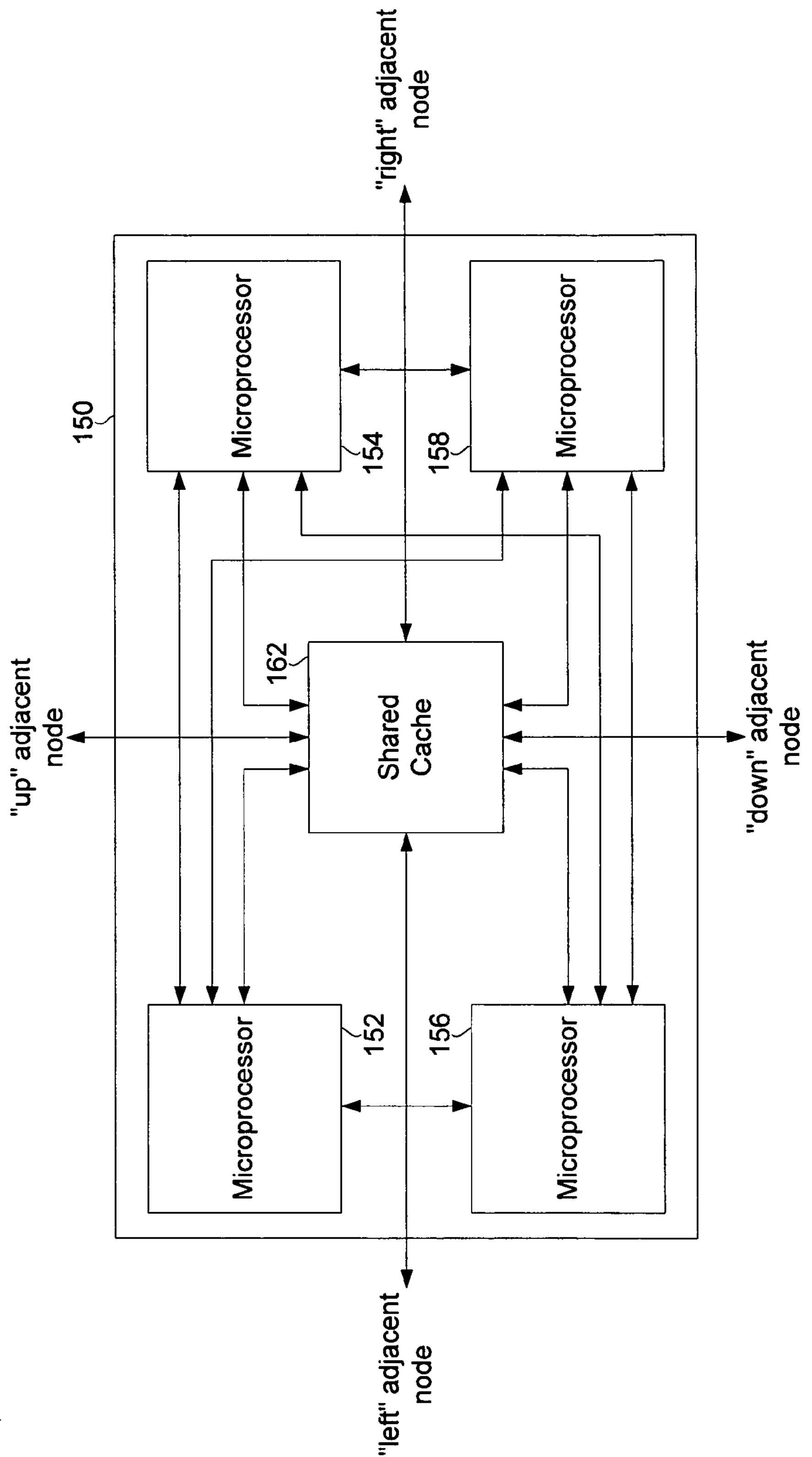
FIG. 7 shows a portion of a computer system in accordance with an embodiment of the present invention.

FIG. 7 shows an exemplary multiprocessing node 150 in accordance with an embodiment of the present invention. In FIG. 7, the multiprocessing node 150 has four microprocessors 152, 154, 156, 158. However, in one or more other embodiments of the present invention, a multiprocessing node may have any number of microprocessors. In FIG. 7, each of the microprocessors 152, 154, 156, 158 is connected to a cache memory (also referred to as "shared cache") 162 via high-bandwidth point-to-point interconnect. The shared cache 162 may also be connected over high-bandwidth point-to-point interconnect to connected multiprocessing nodes (not shown). Further, each microprocessor 152, 154, 156, 158 may be connected to every other microprocessor 152, 154, 156, 158 in the multiprocessing node 150 for, for example, chip-to-chip communication (microprocessors, integrated circuits, and multiprocessing nodes are also generally referred to as "processing nodes").

A "shared cache," as referred to herein, refers to a cache memory that is accessible to a plurality of processing nodes point-to-point connected to the shared cache. In one or more embodiments of the present invention, the shared cache hold copies of data recently and/or frequently transferred among the processing nodes connected to the shared cache.

Further, although the shared cache 162 in FIG. 7 is shown as being connected to adjacent nodes, in one or more other embodiments of the present invention, a shared cache of one node may be connected to one or more non-adjacent nodes.

When one of the microprocessors 152, 154, 156, 158 experiences a cache miss in its local cache memory (e.g., "L2" cache memory) (not shown), a request for the requested data is broadcasted by the requesting microprocessor. The shared cache 162 is configured to observe all such data request broadcasts, and if the shared cache 162 has a copy of the requested data, the shared cache 162 forwards the copy of the requested data to the requesting microprocessor. Otherwise, if the shared cache 162 does not have a copy of the requested data, the shared cache 162 does not respond to the requesting microprocessor, in which case the requesting microprocessor uses a copy of the requested data forwarded (in response to the broadcast) by the other microprocessors 154, 156, 158 or main memory (not shown).

Those skilled in the art will recognize that in one or more embodiments of the present invention, the shared cache 162 may not initiate any transactions. Instead, the shared cache 162 may respond to any observed transaction by executing a cache-to-cache transfer (from the shared cache 162 to a local cache memory of a requesting microprocessor). For example, when a microprocessor (e.g., microprocessor 152) broadcasts a request for data (in response to a local cache miss) and a cache hit occurs in the shared cache 162, the shared cache 162 pre-empts a data response from, for example, main memory (not shown) by executing a cache-to-cache transfer of the requested data to the requesting microprocessor (e.g., microprocessor 152). Alternatively, when the microprocessor (e.g., microprocessor 152) broadcasts a request for data (in response to a local cache miss) and a cache miss occurs in the shared cache 162, the shared cache 162 is "silent" and the requesting microprocessor (e.g., microprocessor 152) accepts a copy of the requested data forwarded from another microprocessor, main memory, or another multiprocessing node.

In one or more embodiments of the present invention, the shared cache 162 may be sized relatively large (e.g., greater than 32 MB) so as to increase the likelihood of finding the requested data in the shared cache 162. The shared cache 162 may hold copies of data that are frequently and/or recently requested by the local microprocessors 152, 154, 156, 158 of the multiprocessing node 150.

Figure 8:
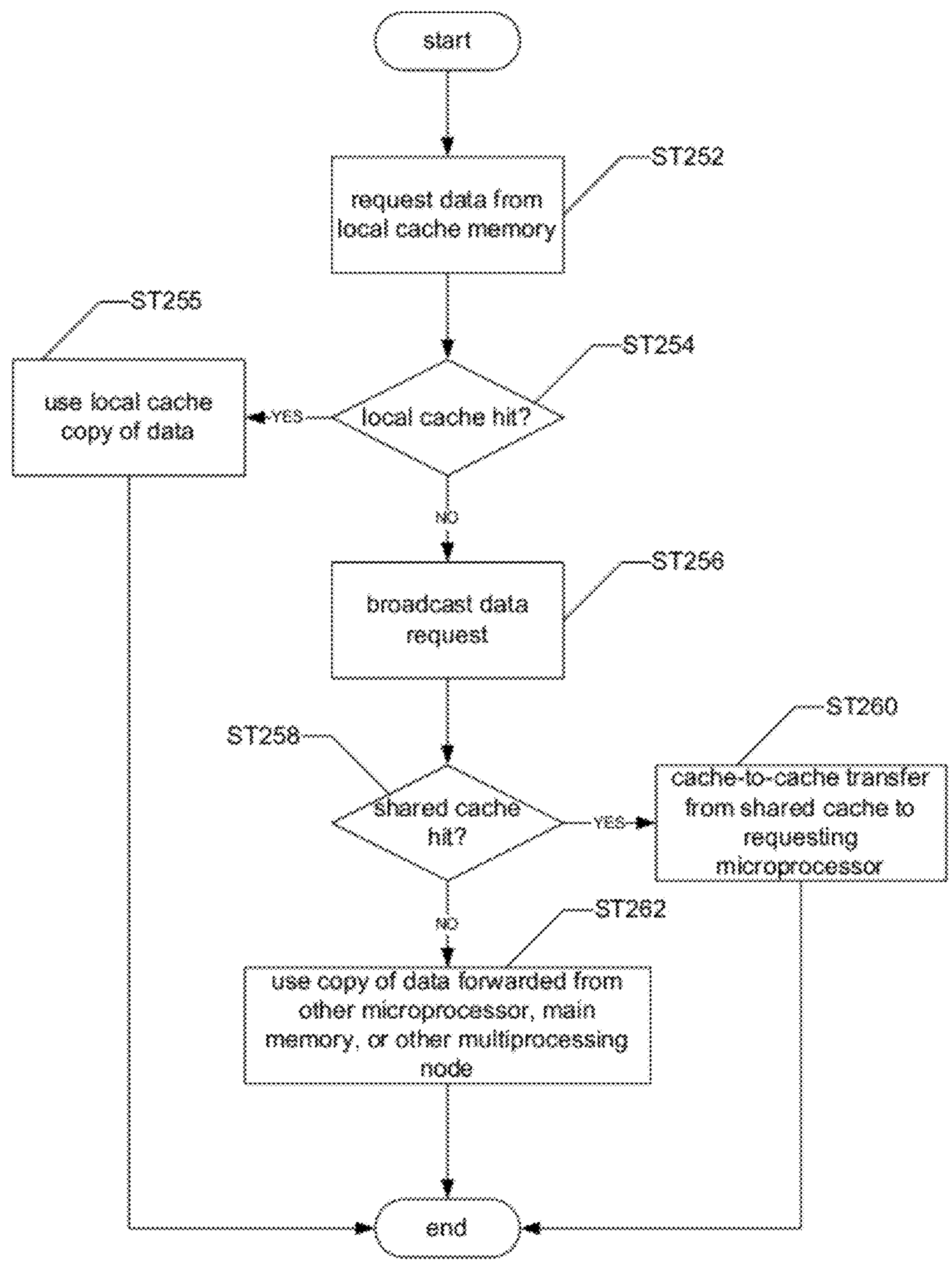
FIG. 8 shows an exemplary flow process in accordance with an embodiment of the present invention.

FIG. 8 shows an exemplary flow process in accordance with an embodiment of the present invention. Initially, a microprocessor in a point-to-point connecting multiprocessing node, in response to executing instructions, requests data from a local cache memory (e.g., L2 cache memory) ST252. If the requested data is found in the local cache memory (i.e., a cache hit occurs) ST254, the requested data is forwarded to and used by the requesting microprocessor ST255.

Otherwise, if the requested data is not found in the local cache memory (i.e., a cache miss occurs) ST254, the requesting microprocessor broadcasts a request for the requested data, where the broadcast includes sending a message to a shared cache ST256 that is point-to-point connected to other microprocessors in the multiprocessing node. If the requested data is not found in the shared cache (i.e., a cache miss occurs) ST258, the requesting microprocessor uses a copy of the requested data forwarded from (i) a local cache memory of another microprocessor, (ii) main memory, or (iii) another multiprocessing node ST262. However, if the requested data is found in the shared cache (i.e., a cache hit occurs) ST258, the shared cache initiates a cache-to-cache transfer by which a copy of the requested data is forwarded from the shared cache to the requesting microprocessor ST260.

In one or more embodiments of the present invention, in the case when a shared cache forwards a copy of requested data to a requesting microprocessor, the response from the shared cache preempts responses to the requesting microprocessor from other components receiving the initial broadcast for the requested data. In other words, responses subsequent to a response from the shared cache may be discarded by the requesting microprocessor. In this way, latency is improved as the requesting microprocessor may continue the execution of a particular process in response to data transferred from the shared cache, noting that the shared cache, in response to a cache hit, may respond more quickly to the requesting microprocessor than other components receiving the initial broadcast for the requested data.

Those skilled in the art will recognize that in one or more embodiments of the present invention, the shared cache only responds to a requesting microprocessor when it has a copy of data requested by the requesting microprocessor.

Figure 9:
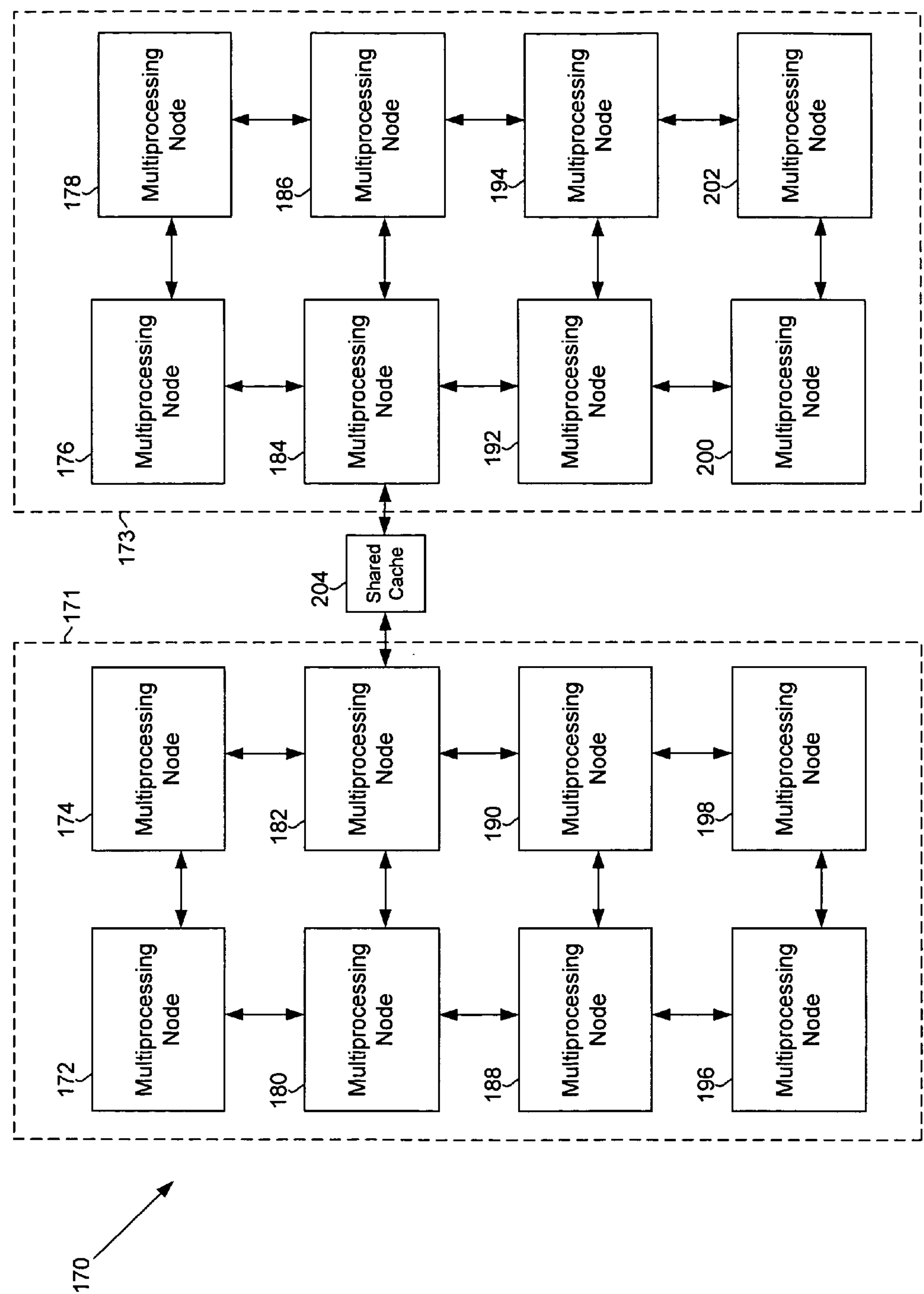
FIG. 9 shows a computer system in accordance with an embodiment of the present invention.

In one or more embodiments of the present invention, a computer system may use a cache memory between two or more groups of multiprocessing nodes. For example, FIG. 9 shows an exemplary computer system 170 in accordance with an embodiment of the present invention. The computer system 170 in FIG. 9 is shown as having two groups of multiprocessing nodes 171, 173. The first group 171 is formed of point-to-point multiprocessing nodes 172, 174, 180, 182, 188, 190, 196, 198. The second group 173 is formed of point-to-point multiprocessing nodes 176, 178, 184, 186, 192, 194, 200, 202. Further, those skilled in the art will recognize that the multiprocessing nodes 172, 174, 176, 178, 180, 182, 184, 186, 188, 190, 192, 194, 196, 198, 200, 202 may be connected in any number of ways.

A shared cache 204 is positioned between the first group 171 and the second group 173. In one or more embodiments of the present invention, the shared cache 204 may hold copies of data recently and/or frequently used by the computer system 170. When a particular multiprocessing node issues a broadcast for requested data, the shared cache 204 is configured to observe the broadcast. If the shared cache 204 has a copy of the requested data, the shared cache 204 initiates a cache-to-cache transfer that may be accepted by the requesting multiprocessing node if the requesting multiprocessing node has not already received a copy of the requested data (from, for example, a more closely positioned multiprocessing node). In the case that a copy of the requested data is transferred from the shared cache 204 to the requesting multiprocessing node, subsequent responses received by the requesting multiprocessing node may be discarded.

Figure 10:
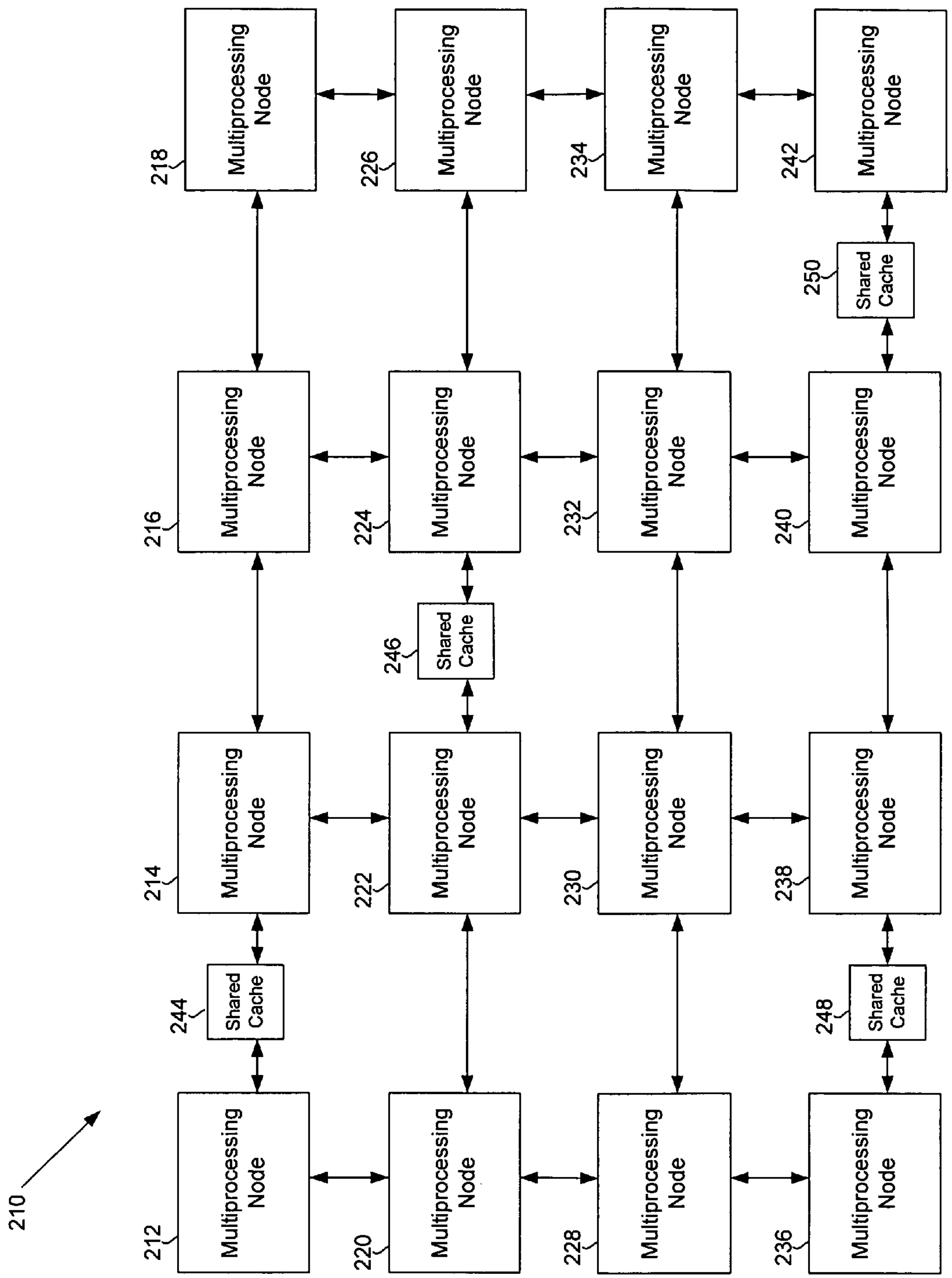
FIG. 10 shows a computer system in accordance with an embodiment of the present invention.

In one or more embodiments of the present invention, a computer system may have a plurality of shared cache memories that are positioned between various groups of multiprocessing nodes. FIG. 10 shows an exemplary computer system 210 in accordance with an embodiment of the present invention. In FIG. 10, a plurality of multiprocessing nodes 212, 214, 216, 218, 220, 222, 224, 226, 228, 230, 232, 234, 236, 238, 240, 242 are point-to-point connected using high-bandwidth interconnect (shown but not labeled). Further, those skilled in the art will recognize that the multiprocessing nodes 212, 214, 216, 218, 220, 222, 224, 226, 228, 230, 232, 234, 236, 238, 240, 242 may be connected in any number of ways.

A plurality of shared cache memories 244, 246, 248, 250 are interspersed in the computer system 210. Particularly, shared cache 244 is disposed between multiprocessing nodes 212, 214; shared cache 246 is disposed between multiprocessing nodes 222, 224; shared cache 248 is disposed between multiprocessing nodes 236, 238; and shared cache 250 is disposed between multiprocessing nodes 240, 242. The shared cache memories 244, 246, 248, 250 may be arbitrarily or specifically disposed throughout the computer system 210 to improve the overall latency of the computer system 210. The shared cache memories 244, 246, 248, 250 observe transactions propagated throughout the computer system 210 and may respond to broadcasts for requested data.

Those skilled in the art will recognize that the placement of one or more shared cache memories in a computer system may be at the discretion of the designer. Further, the placement of one or more shared cache memories in a computer system may be based, at least in part, on latency requirements of the overall system. In one or more embodiments of the present invention, latency requirements may relate to a number of microprocessing nodes and/or their respective distances from main memory.

Further, in one or more embodiments of the present invention, a shared cache memory may be "address-interleaved" with another shared cache memory. Address-interleaving interconnects cache lines of the cache memories in order to divide incoming data requests. For example, a system may interconnect a first cache memory and second cache memory. The first cache memory may handle odd cache lines and the second cache memory may handle even cache lines. In this manner, an incoming data request can be properly routed, such that all data requests are not routed to a single cache memory that serially handles each data request. Those skilled in the art will recognize that in one or more other embodiments of the present invention, cache memories may be addressed-interleaved in any number of ways.

Advantages of the present invention may include one or more of the following. In one or more embodiments of the present invention, a cache memory may be disposed in a multiprocessing node and may be point-to-point connected to a plurality of microprocessors in the multiprocessing node. When a request for data is broadcasted by a requesting microprocessor in the multiprocessing node, the cache memory may forward a copy of the requested data to the requesting microprocessor, thereby improving system latency.

In one or more embodiments of the present invention, a shared cache may be easily disposed into a near-commodity shelf server having point-to-point connected microprocessors.

In one or more embodiments of the present invention, one or more shared cache memories may improve latency of near-commodity shelf servers that are point-to-point connected.

While this invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
- a first plurality of point-to-point connected processing nodes comprising:
  - a processing node configured to:
    - broadcast a cache-miss data request for a data item;
    - receive a first response to the cache-miss data request comprising the data item; and
    - discard, after receiving the first response, a second response to the cache-miss data request;

a second plurality of point-to-point connected processing nodes;

a passive backplane comprising:

a first shared memory point-to-point connecting the first plurality of processing nodes and the second plurality of processing nodes and configured to:

observe the cache-miss data request for the data item;

identify the data item within the first shared memory;

transmit the first response comprising the data item to the processing node; and a second shared memory point-to-point connecting the first plurality of processing nodes and the second plurality of processing nodes, wherein the second shared memory is address-interleaved with the first shared memory; and a third shared memory disposed within the second plurality of processing nodes and configured to:

snoop the first response; and update a local version of the data item in the third shared memory based on the first response.

2. The system of claim 1, wherein the first plurality of processing nodes and the second plurality of processing nodes are associated with a grid topology.

3. The system of claim 1, wherein the second shared memory is associated with even cache lines and the first shared memory is associated with odd cache lines.

4. The system of claim 1, wherein the first plurality of processing nodes are interconnected using point-to-point interconnects having a bandwidth exceeding a 16-bit 1 MHz interconnect.

5. The system of claim 1, wherein each of the first plurality of processing nodes and the second plurality of processing nodes are symmetric multiprocessing (SMP) computer systems.

6. The system of claim 1, further comprising:

a fourth shared memory disposed within the second plurality of processing nodes.

7. The system of claim 1, wherein the first shared memory is at least 32 MB in size.

8. The system of claim 1, wherein the first response is associated with a cache-to-cache transfer.

9. The system of claim 1, wherein address-interleaving interconnects cache lines of the first shared memory and the second shared memory.

10. The system of claim 1, wherein the first plurality of processing nodes reside in a first near-commodity modular shelf server and the second plurality of processing nodes reside in a second near-commodity modular shelf server.

11. A computer-implemented method comprising:

detecting, by a processing node of a first plurality of point-to-point connected processing nodes, a cache miss;

broadcasting, by the processing node and in response to the cache-miss, a cache-miss data request, for a data item;

receiving, by a memory selected from a group consisting of a first shared memory and a second shared memory residing on a passive backplane, the data request for the data item, wherein the first shared memory is address-interleaved with the second shared memory, and wherein the first shared memory and the second shared memory are connected to the first plurality of processing nodes and a second plurality of processing nodes by a plurality of point-to-point connections of the passive backplane;

generating, by the memory, a first response comprising the data item to satisfy the data request;

receiving, by the processing node, the first response comprising the data item;

discarding, by the processing node, a second response to satisfy the data request after receiving the first response;

snooping the first response by a third shared memory disposed within the second plurality of processing nodes; and updating, by the third shared memory, a local version of the data item based on the first response.

12. The method of claim 11, wherein the first plurality of processing nodes use a point-to-point interconnect having a bandwidth exceeding a 16-bit 1 MHz interconnect.

13. The method of claim 11, wherein the first plurality of processing nodes and the second plurality of processing nodes are associated with a grid topology.

14. The method of claim 11, wherein each of the first plurality of processing nodes and the second plurality of processing nodes are symmetric multiprocessing (SMP) computer systems.

15. The method of claim 11, wherein the second shared memory is associated with even cache lines and the first shared memory is associated with odd cache lines.

16. The method of claim 11, wherein the first response is associated with a cache-to-cache transfer.

17. The method of claim 11, wherein address-interleaving interconnects cache lines of the first shared memory and the second shared memory.

18. The method of claim 11, wherein the first plurality of processing nodes reside in a first near-commodity modular shelf server and the second plurality of processing nodes reside in a second near-commodity modular shelf server.

* * * * *